C. E. BONINE.
LOCKING DEVICE FOR CONTROL LEVERS OF AUTOMOBILES.
APPLICATION FILED DEC. 24, 1917.
1,325,887. Patented Dec. 23, 1919.
FIG. I.
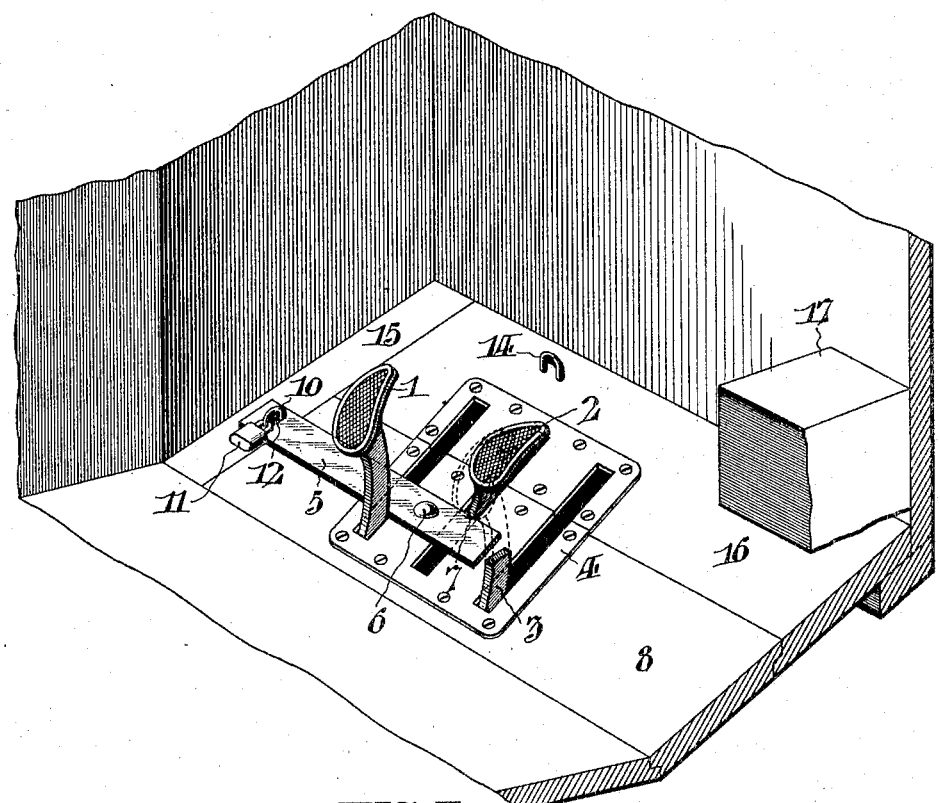
FIG. II.
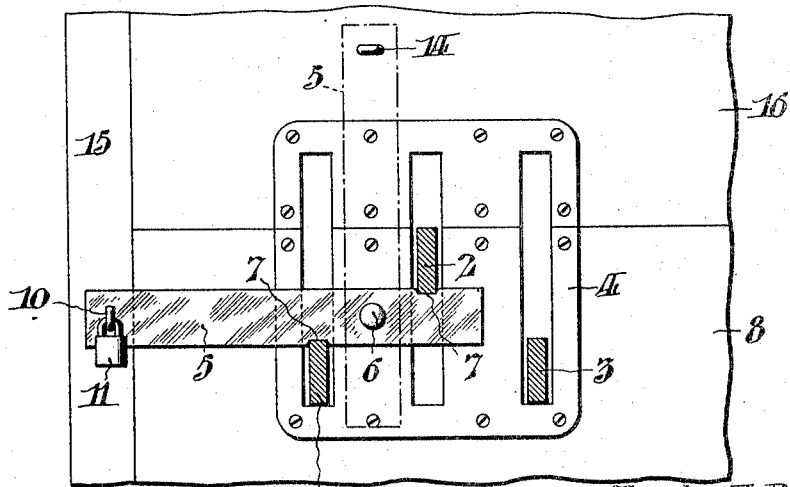
Witnesses
John C. Bergner
James H. Bell
Inventor
Charles E. Bonine,
By Wiley & Paul
Attorneys.

UNITED STATES PATENT OFFICE.

CHARLES E. BONINE, OF MELROSE PARK, PENNSYLVANIA.

LOCKING DEVICE FOR CONTROL-LEVERS OF AUTOMOBILES.

1,325,887.   Specification of Letters Patent.   Patented Dec. 23, 1919.

Application filed December 24, 1917. Serial No. 208,606.

*To all whom it may concern:*

Be it known that I, CHARLES E. BONINE, a citizen of the United States, residing in Melrose Park, in the township of Cheltenham; county of Montgomery and State of Pennsylvania, have invented certain new and useful Improvements in Locking Devices for Control-Levers of Automobiles, whereof the following is a specification, reference being had to the accompanying drawings.

My invention relates to locking devices for automobiles in which the forward movement is controlled by one lever and the reverse movement by another. In such automobiles if both levers are placed in their effective positions at the same time, the engine is locked against any rotation whatsoever.

It is the object of this invention to provide a pivotally attached locking bar by which the forward and reverse levers may both be held in their effective positions at the same time, and also to provide a means by which the locking bar may be securely fastened to the frame of the car, so as to prevent its removal from this position.

In this type of automobile it is customary to have the forward and reverse levers, which are usually pedal levers, operating in parallel slots cut in the foot boards and located in proximity to each other. The reverse pedal is in its effective position when it approaches the forward end of its operating slot. The forward pedal is in effective position when near either end of its operating slot. With this construction I employ a lever of the first class pivoted between the slots of the forward and reverse pedals, so that it may be moved to a position between and parallel to the slots in which it does not interfere with the pedals, or may be moved to a position at an angle to the slots where it will extend across or intercept the slots and the paths of movement of the pedal levers in such a way that one end engages the reverse pedal and holds it in its forward and effective position, and the other end engages the forward pedal and holds it back in one of its effective positions, thus obtaining the locking effect explained.

Such a device, however, is not entirely effective if secured to the foot boards of the machine alone, because it is a comparatively simple matter to remove the foot boards, and free the operating levers from their engagement with the locking device. I, therefore, provide that one end of the locking bar shall be of such length as to project beyond the foot boards of the machine a sufficient distance to be secured by suitable locking means, to the frame of the automobile. This renders the removal of the foot boards and the disentanglement of the locking bar from the pedal levers impossible.

In the accompanying drawings, Figure I represents in perspective the foot-board of an automobile with its control pedal levers having my locking device applied thereto.

Fig. II is a plan view of a portion of the foot-board.

In the drawings, the automobile is provided with the forward pedal lever 1, the reverse pedal lever 2, and the brake pedal lever 3, all of which operate in slots cut in the foot-board 8, and in the pedal plate 4. My invention comprises a locking bar 5, pivoted as a lever of the first class by a bolt 6, to the foot-board 8, and the pedal plate 4, at a point between the slots in which the forward lever and the reverse lever respectively operate, so as to swing substantially in the plane of said foot board and pedal plate. The locking-bar 5, is so shaped, as for example by the provision of notches 7, 7, as to be capable of taking a more or less transverse position, as illustrated in Fig. I, of the drawings, wherein the forward edge of the locking-bar bears upon the reverse pedal lever 2, to hold it forward and in gear while the rearward edge of the locking bar bears upon the forward pedal lever 1, to hold it in gear in its retracted position. By holding the bar 5, locked in this position, the automobile is rendered immovable, and this is accomplished by simple means, as for example, the staple 10, and the padlock 11.

I secure this staple to the frame 15, at the side of the foot-boards. The bar 5, is made long enough to reach to this staple and has a slot 12, cut near its end through which the staple passes to receive the hasp of a padlock 11, which thus locks it firmly in place. A second staple 14, is also provided in such position as to keep the locking bar 5, in its inoperative position, more or less parallel to the two slots between which it is pivoted. By attaching the staple 10, to the frame 15, it is impossible to move the foot-boards sufficiently to operate the pedal levers. The uppermost foot-board 16, is held against removal by the overlapping rabbet formed on the edge of the foot-board 8, and by the close proximity of the coil box 17. The foot-board 8, cannot be removed while the lever 5, is locked to the side frame 15, and the locking bar cannot be disengaged from the pedal levers even by lifting the foot-board 8.

The advantage of this device is its simplicity, its effectiveness, the ease with which it is operated, and the readiness with which it may be applied.

Having thus described my invention, I claim:

1. An automobile locking device comprising a locking bar attached to the automobile foot-board, between its control levers, so that it can be moved from a position between the paths of movement of said levers, where it does not interfere with their movement, to a position where it extends across their paths and holds them at opposite ends thereof, and vice versa, and means for securing said locking bar in its latter position.

2. An automobile locking device, comprising a locking bar pivoted to the automobile foot-board, between the control levers, as a lever of the first class, so as to swing, substantially in the plane of said foot-board, from a position between the paths of movement of said control levers, where it does not interfere with their movement, to a position where it extends across their paths and holds them at opposite ends thereof, and vice versa, and means for securing said locking bar in its latter position.

3. An automobile locking device comprising a pedal plate for an automobile foot-board, slotted for the operation of control levers, a locking bar pivoted to said plate between its slots as a lever of the first class, so as to swing, substantially in the plane of said plate, from a position between said slots, where it does not interfere with movement of said control levers, to a position where it extends across said slots and holds said levers at opposite ends thereof, and vice versa, and means for securing said locking bar in its latter position.

4. An automobile locking device comprising a locking bar pivoted to the automobile foot-board, between its control levers, as a lever of the first class, so as to swing, substantially in the plane of said foot-board, from a position between the paths of movement of said control levers, where it does not interfere with their movement, to a position where it extends across their paths and holds them at opposite ends thereof, and vice versa, and means on the automobile frame for securing said locking lever thereto to hold it in its last mentioned position.

In testimony whereof I have hereunto signed my name at Philadelphia, Pennsylvania, this fifteenth day of December, 1917.

CHARLES E. BONINE.

Witnesses:
JAMES H. BELL,
E. L. FULLERTON.